United States Patent [19]

Ballard et al.

[11] 4,324,838
[45] Apr. 13, 1982

[54] DRY POWDER COMPOSITIONS OF VERMICULITE LAMELLAE AND ADDITIVES

[75] Inventors: Denis G. Ballard, Littleton; Richard M. Charnah, Thornaby; John F. Droughton, Tarvin; Graham R. Rideal, Handbridge, all of England

[73] Assignee: Imperial Chemical Industries Limited, London, England

[21] Appl. No.: 66,766

[22] Filed: Aug. 14, 1979

[30] Foreign Application Priority Data

Aug. 17, 1978 [GB] United Kingdom ............... 33722/78

[51] Int. Cl.³ ................................................. B32B 5/16
[52] U.S. Cl. .................................... 428/402; 106/86; 106/88; 106/DIG. 3; 252/378 R; 423/327; 423/328; 428/324; 428/363; 428/338
[58] Field of Search ............... 428/338, 363, 402, 324; 106/DIG. 3, 86, 88; 423/327, 328; 252/378 R

[56] References Cited

U.S. PATENT DOCUMENTS

| | | | |
|---|---|---|---|
| 2,311,588 | 2/1943 | Denning | 106/DIG. 3 |
| 2,364,436 | 12/1944 | Frisch | 106/DIG. 3 |
| 2,538,236 | 1/1951 | Denning | 428/338 |
| 3,001,571 | 9/1961 | Hatch | 428/338 |
| 3,325,340 | 6/1967 | Walker | 428/338 |
| 3,515,624 | 6/1970 | Garnero | 428/402 |
| 3,953,357 | 4/1976 | Preston | 106/DIG. 3 |
| 4,130,687 | 12/1978 | Ballard | 428/920 |
| 4,269,628 | 5/1981 | Ballard | 428/310 |

FOREIGN PATENT DOCUMENTS 1202097 8/1970 United Kingdom ......... 106/DIG. 3

*Primary Examiner*—Ellis P. Robinson
*Attorney, Agent, or Firm*—Cushman, Darby & Cushman

[57] ABSTRACT

A free-flowing, dry powder composition comprising vermiculite lamellae (delaminated vermiculite); preferably the composition contains a solid particulate additive such as magnesium oxide.

19 Claims, No Drawings

DRY POWDER COMPOSITIONS OF VERMICULITE LAMELLAE AND ADDITIVES

This invention relates to compositions containing the mineral vermiculite and particularly to free-flowing dry-powder compositions containing vermiculite in delaminated form.

It is known that the layer silicate mineral vermiculite may be swollen by the action of aqueous salts and thereafter the structure may be delaminated by mechanical shearing of the resulting aqueous suspension to yield thin platelets termed "vermiculite lamellae".

Other layer silicate minerals, for example hydrobiotites and chlorite-vermiculites, also contain a substantial proportion of vermiculite layers and these minerals also may be swollen and delaminated in the same or similar manner to yield thin lamellae and it is to be understood that all such minerals are included in the term "vermiculite" as used throughout this specification.

By the term "vermiculite lamellae" we mean particles of delaminated vermiculite that are platelets having a thickness of less than one tenth of a micrometer ($10^{-7}$ m) usually less than one hundredth of a micrometer ($10^{-8}$ m).

Furthermore it is known, for example from United Kingdom Patent Specification Nos. 1,016,385 and 1,119,305, U.S. Pat. No. 4,130,687 and German Offenlegungsschrift No. 27 41 857 that aqueous suspensions of vermiculite lamellae may be used to form shaped solid articles composed of vermiculite lamellae, for example fire-resistant sheet and foams. The solid articles are made by the removal of water from the aqueous vermiculite suspensions, whereby the vermiculite lamellae adhere together by their own mutually attractive forces. The aqueous suspension may be cast into moulded forms, for example rigid foams made by gasification of the suspension of vermiculite lamellae before moulding and removal of water.

In the known processes for making solid products of vermiculite, the products are made directly from the aqueous suspension of vermiculite lamellae. The present invention is based on the discovery that there may be advantages in converting the aqueous suspension of vermiculite lamellae into a substantially dry, free-flowing powder prior to forming shaped solid articles of the vermiculite lamellae. Thus, for example, we have observed that in general, foamed products made from the dry powder, especially spray-dried powder, surprisingly have a lower density than foams made directly from the undried aqueous suspension, without apparent loss in compressive strength; an improvement in density of up to 20% has been observed without any significant loss in compressive strength. A further advantage arises in respect of the stability and storage characteristics of the dry powder compared with the aqueous suspension, especially when the composition contains additional materials, for example additives designed to enhance one or more properties of products derived from the composition.

According to the present invention there is provided a free-flowing, essentially dry, powder composition comprising vermiculite lamellae.

Preferably the composition is the product of spray-drying an aqueous suspension comprising vermiculite lamellae. Other forms of drying may, however, be used if desired, for example a slurry of vermiculite lamellae may be dried by a "flash-drying" technique. Any conventional spray-drying equipment can be employed, and the atomiser may be a rotating disc, nozzle or spray-head.

As stated above, one of the major advantages of the dry-powder composition compared with the aqueous suspension is its stability and storage capability when there is incorporated an additive intended to enhance one or more properties such as density, compressive strength or resistance to disintegration by water (water-stability) of solid products, especially foams, made from the composition. Stable, free-flowing, dry-powder compositions comprising an intimate mixture of vermiculite lamellae and one or more additives designed to enhance a property of solid products made from the compositions are provided according to a preferred embodiment of the invention. Especially preferred are compositions wherein the additive is in particulate form.

By way of example, we have found that incorporation of particulate metal oxides which provide a basic reaction in water, especially magnesium oxide and calcium oxide, results in a significant improvement in the compressive strength and water-stability of lowdensity foams made from the compositions of the invention. Therefore an example of a specific composition of the invention is a stable, free-flowing, dry-powder composition comprising an intimate mixture of vermiculite lamellae and particles of a metal oxide or hydroxide which provides a basic reaction in water, especially magnesium oxide or calcium oxide.

The compositions of the invention will usually be prepared by drying, especially spray-drying, an aqueous suspension of vermiculite lamellae. In the case where the composition contains an additional material, for example a particulate metal oxide, this additional material may be incorporated prior to, during or after drying of the suspension. For convenience, and in order to ensure intimate mixing of the ingredients, the additive (providing it does not interfere with drying the suspension) may be incorporated in the suspension prior to the drying operation, in which case the additive may be incorporated prior to, during, or after swelling or shearing of the suspension. The additive will generally be incorporated immediately before the suspension is dried, especially in cases where the additive results in a suspension of limited stability. For example, the additive may be metered into the suspension as a powder or slurry adjacent the spray-head of a spray-drying apparatus.

The dry-powder compositions of the invention may, if desired, be compacted under pressure into pellets, tablets or blocks for ease of handling and transport.

In using the compositions of the invention to form shaped solid articles such as sheets or foams, the composition is dispersed in an aqueous medium to form a suspension or slurry for conversion by drying, if appropriate after moulding or casting and gasification (if a foam is desired), into the desired product.

It has been observed that when a composition according to the invention containing an additive is suspended in water, there may be a slow reaction between the vermiculite lamellae and the additive, for example if the additive reacts as an inorganic base in water. Whilst this reaction may be desirable for improvement in the physical properties of the products, it can be disadvantageous if allowed to go too fast during the formation and handling of the suspension because flocculation of the suspension may occur causing impairment of some properties of the products e.g. the bubble size and density of foamed products.

Accordingly there may be problems in the handling of aqueous suspensions derived from the compositions of this invention, especially if rigid foams of low density are desired as the end-products, and the nature of the additive material may need to be chosen with care, having in mind the end-product to be formed.

The materials in the composition other than vermiculite lamellae include inorganic materials containing oxygen, often containing only one element and oxygen, for example powdered oxides such as magnesium oxide, calcium oxide and boric oxide, fused or gelled oxides in particulate form, or glasses in a finely divided form including powdered and fibrous glasses.

Other useful oxygen containing materials are oxyacid salts for example carbonates, sulphates, borates silicates and phosphates. Many common filler materials, including minerals, may conveniently and advantageously be used, including carbonate fillers especially calcium and magnesium carbonates, silicate fillers especially kaolin, powdered slate and mica Portland cement and various forms of silica, for example sand. Amongst the oxides which are suitable we include silica, titanium dioxide and zinc oxide, whilst the preferred oxides are boric oxide, calcium oxide, alumina and magnesium oxide.

The additives may also include naturally occurring materials (e.g. clay, bentonite, fullers earth and diatomaceous earth), synthetically prepared particulate forms (e.g. beads or fibres of fused material such as glass) or synthetic minerals (e.g. alumino silicates) and the surface of any of these may usefully be treated in order to induce greater adhesion to the lamellae of vermiculite when a suspension of the composition in water is dried to form a solid product.

Powdered organic materials, for example dextrin and polysaccharides may be included in the compositions.

We prefer to use inorganic particles possessing a density less than (ideally much less than) the inherent density of the material of which they are composed, for example particles which are cellular, hollow or otherwise incorporating voids without being porous externally. A particularly suitable range of particles are hollow micro-spheres for example those selected from "flyash", or micro-baloons made synthetically from glass or silica. Low density particles are especially useful in the present invention because solid products formed from the compositions will exhibit a much lower density than is normally found for inorganic or mineral products. This is especially true if the solid product has a cellular or foamed structure and the added inorganic particles (preferably themselves of low density) are dispersed in a cellular matrix of vermiculite.

Inorganic, lightweight blocks have been made using hollow glass micro-spheres as the inorganic particles by forming an aqueous suspension of the mixture of spheres and vermiculite lamellae. If the mixture is then aerated or gasified and dried down between flat plates, a slab of non-combustible low density foam is obtained. Typically, prior-art inorganic foamed blocks even those filled with micro-spheres, possess densities much greater than those produced from the compositions of this invention.

Foamed blocks made from the compositions of the invention containing inorganic particulate materials possess a much greater compressive strength (e.g. three times greater) than other inorganic foams, and they may even match the compressive strengths of typical or common inorganic cellular blocks having much higher densities (e.g. higher by a factor of 2 or 3).

The proportions of vermiculite lamellae and other particles may vary over a wide range from as little as 5% by weight of non-vermiculite particles up to compositions containing 90% by weight of other material and only 10% vermiculite. However, for best results we prefer to use at least 20% vermiculite lamellae. In order to obtain properties significantly different from vermiculite foam, we prefer to use at least 5% by weight of other particles. The vermiculite lamellae promote superior adhesion to the other particles when the lamellae are present to at least 20% of the total weight of the composition.

Products prepared from the compositions of the invention have a range of properties, but are in general rigid materials which do not exhibit the brittleness shown by many inorganic composites e.g. ceramics or glasses and which are suitable for making into sheets, boards, bricks or blocks having applications in several industries, particularly in the construction industry.

Use of the products may be decorative or purely functional in areas where some or all of the advantages of low density, non combustibility, compressive strength and thermal or accoustic insulating properties are required, as for instance in walls, ceilings or floors, temporary living accommodation, office partitions or furniture, fire doors or barriers, linings for ovens or furnaces or protective linings for electrical equipment where discharges may occur.

The products may be easily laminated with other materials, preferably though not exclusively non-flammable, to enable composites of different surface appearance or with different surface properties to be produced, an example being the use of vermiculite sheet to produce an easily used building panel of good appearance with a wear resistant surface.

As stated hereinbefore, the preferred additives for incorporation in the compositions of the invention are solid particulate inorganic materials. One class of such materials which provide a good combination of improvement in properties of the vermiculite articles together with ease of handling, are basic oxides which have a limited solubility in water, for example a solubility in water of not greater than 10 g/l and preferably not greater than 3 g/liter. Oxides which are more soluble than 10 g/l tend to cause rather rapid flocculation of the aqueous vermiculite suspensions; such suspensions are difficult to handle because they cannot be processed to the final article sufficiently speedily to prevent the flocculation spoiling the formation of acceptably strong articles. We prefer the solid particulate material to be an oxide or hydroxide of an alkaline earth metal, preferably the oxide or hydroxide of calcium or magnesium. The especially preferred material is magnesium oxide because this material possesses an especially desirable combination of properties for improving vermiculite compositions. Magnesium oxide imparts both water-stability and compressive strength to foamed articles made of vermiculite lamellae and allows foams of lower density to be made than is possible with vermiculite lamellae alone.

According to a preferred aspect of the invention we provide a free-flowing dry-powder composition comprising vermiculite lamellae and particles of magnesium oxide.

The particles of magnesium oxide are preferably within the size range 1 $\mu$m to 20 $\mu$m and we have observed that samples of magnesium oxide in the lower half of this range produce strong, low-density foams.

The behaviour of the particulate material added to the vermiculite when the composition is suspended in water, for example the rate of solubility of the particulate material in water and hence the rate at which basic ions will be produced, may be controlled by surface treatment of the particles for example coating the particles with water-soluble films or heat-treatment of the particles to partially fuse the surface layer of each particle.

The solid particulate basic material, in particular the oxide or hydroxide of alkaline earth metals, is preferably present in the composition at concentrations from 1% to 40% especially useful at 5% to 15% by weight of vermiculite.

Magnesium oxide is most usefully present at greater than 3% w/w and less than 15% w/w. Higher concentrations may be used but without significant advantage.

We prefer the vermiculite lamellae to have been classified prior to the formation of any of the dry-powder compositions described herein and for example all vermiculite particles greater than 50 μm in their largest dimension to have been removed.

The invention is illustrated but in no way limited by the following examples, in which all parts and percentages are by weight unless otherwise stated:

EXAMPLE 1

A 20 Kg batch of South African vermiculite (Mandoval micron grade) was refluxed for 30 minutes in 25 l of saturated salt solution in a 50 l reflux vessel after which time it was thoroughly washed in de-ionised water filtered and returned to the 50 l reflux vessel. The vermiculite was then refluxed for 30 minutes in 25 l of 1 M n-butylammonium chloride solution. After thorough washing in de-ionised water and standing overnight, the bulk volume of the vermiculite had expanded to 70 l. The aqueous suspension of swollen vermiculite was adjusted to 20% solids concentration and then milled for 30 minutes in a Hobart vertical cutter mixer (Model VCM 40) at a speed of 3000 rpm. The larger particles were removed from the suspension by passing the suspension (diluted to 15%) through a vibrating sieve having an aperture size of 50 μm. The resulting classified suspension containing vermiculite lamellae of particle size less than 50 μm was spray dried in a Niro "Production Minor" spray-drying apparatus. Using a temperature of 330° C. at the spray-head and 110° C. at the base of the collecting chamber, an output of 3 kg/hr of spray-dried powder of bulk densities 220 Kg/m³ was obtained.

The vermiculite powder was then dry-blended with 10% of its weight of "light" magnesium oxide in a Kenwood Chef whisk. Water was added to the mix to produce a 20% vermiculite slurry which on continuous vigorous beating for 4 minutes formed a foam. The foam was cast into a 6'×6' slab and dried on a heated tray at 70° C.

The properties of the dried foam are shown in Table I following Example 8.

EXAMPLE 2

A spray-dried powder of vermiculite lamellae of particle size <50 μm was prepared as described in example 1. A 20% slurry in water was foamed in a Kenwood Chef whisk and 17% of magnesium hydroxide powder based on the vermiculite was added and mixed into the foam for 1.5 minutes. The wet foam was cast and dried as in example 1. The properties of the dried foam are shown in Table I.

EXAMPLE 3

The procedure of Example 2 was repeated except that 9% of calcium hydroxide powder was used instead of the magnesium hydroxide. The properties of the dried foam are shown in Table I.

EXAMPLE 4

Vermiculite ore was swelled and milled as described in Example 1 and the suspension, without sieving, was spray-dried as in Example 1. The spray-dried powder was found to have a bulk density of 320 Kg/m³. The powder was mixed with water to form a 20% slurry which was foamed in the Kenwood Chef mixer. 10% of "light" magnesium oxide based on the vermiculite was added and a dried slab of foam prepared as described in example 1. The properties of the dry foam are shown in Table 1.

EXAMPLE 5

A wet foam of 20% vermiculite slurry was prepared as described in Example 2 and 7.4% of Dextrin based on the vermiculite was mixed in. The properties of the dried slab of foam are shown in Table I.

EXAMPLE 6

A spray-dried vermiculite powder made from a slurry of particle size <50 μm was placed in the hopper of a continuous foam-making machine as used in the food industry (an "Oakes" mixer, type 4 M). Water was metered in at the base of the hopper to produce a 20% slurry of the vermiculite and this slurry was foamed and cast continuously onto a moving belt. After aeration and drying, the foam had the properties shown in Table I.

EXAMPLE 7

Spray-dried vermiculite powder made from a slurry of particles sizes less than 50 μm was blended with 10% of "light" magnesium oxide and the dry mix was fed through the hopper of an "Oakes" continuous mixer (type 4 M). Water was continuously metered in at the base of the hopper to produce a 20% slurry. The foam was cast, and after aeration and drying, the foam slab had the properties shown in Table I.

EXAMPLE 8

Vermiculite powder produced from a slurry containing lamellae less than 50 μm was mixed into water to form a suspension containing 20% of vermiculite. The suspension was foamed in a Kenwood Chef mixer. No additive was used. The properties of the foam are shown in Table I.

TABLE I

| Ex No | Additive | % Additive (on vermiculite) | Mixing Time (mins) | FOAM Density (Kg/m³) | Comp Strength (MN/m²) |
|---|---|---|---|---|---|
| 1 | MgO | 10 | 4 | 160 | 0.62 |
| 2 | Mg(OH)$_2$ | 17 | 1.5 | 140 | 0.41 |
| 3 | Ca(OH)$_2$ | 9 | 1.5 | 140 | 0.30 |
| 4 | MgO | 10 | 1.5 | 130 | 0.29 |
| 5 | Dextrin | 7.4 | 2 | 110 | 0.20 |
| 6 | None | — | — | 62 | 0.01 |
| 7 | MgO | 10 | approx | 97 | 0.40 |

TABLE I-continued

| Ex No | Additive | % Additive (on vermiculite) | Mixing Time (mins) | FOAM Density (Kg/m³) | FOAM Comp Strength (MN/m²) |
|---|---|---|---|---|---|
| 8 | None | — | 1 — | 95 | 0.04 |

EXAMPLES 9 to 12

Spray-dried vermiculite powder was produced as described in Example 1. The powder was mixed with water in a Kenwood Chef mixer fitted with whisk to yield a 20% slurry. Boric acid powder was added to the suspension which then was mixed thoroughly and foamed. The foam was cast into a slab and dried on a heated tray at 70° C. The properties of the dry foam are shown in Table II. The above procedure was repeated three times (Examples 10, 11 and 12) except that boric oxide powder was used instead of boric acid. Foam properties are shown in Table II.

TABLE II

| Ex No | Additive | % Additive (on vermiculite) | Density (Kg/m³) | Comp Strength (MN/m²) |
|---|---|---|---|---|
| 9 | Boric acid | 10.64 | 107 | 0.184 |
| 10 | Boric oxide | 16.67 | 172 | 0.333 |
| 11 | Boric oxide | 15.16 | 277 | 0.362 |
| 12 | Boric oxide | 16.67 | 112 | 0.111 |

EXAMPLE 13

A 5% suspension (classified to <50 μm) of vermiculite was produced as described in Example 1 and this suspension was spray-dried in a Niro "Mobile Minor" spray-drier. The suspension was fed by a peristaltic pump to a turbine driven spinning atomiser head (24,000 rpm). The spray descends through a drying chamber heated by gas from a bunsen-style burner. Initially the hot gases travel counter to the spray and lower in the chamber a co-current stream of gases entrains the dry particles. The dry powder and co-current gas stream passes through a cyclone separation from the base of the drying chamber and the separated dry powder is collected in a pre-warmed jar to avoid condensation as it is cooled. The feed rate of the slurry was 750 to 800 cm³hr⁻¹, at which rate steady-state conditions were achieved at an inlet temperature to the drying chamber of 180° C. and an outlet temperature of 100° C.

The product was a free-flowing, dry powder comprising vermiculite lamellae as demonstrated by analysis using a transmission electron microscope which clearly showed a platelet structure for the powder. Particle diameters were mainly in the range 0.5 to 2.0 μm. It was observed that shaking the powder in air led to a 2.5-fold increase in volume of the powder due to entrainment of air. Outstanding air was lost as bubbles from the surface and the volume returned to 1.5 times its original value. Gentle agitation of the powder produced an almost complete return to compacted powder.

The dry, free-flowing powder was then mixed with water to yield a 5% slurry and several sheets were produced by casting the slurry into films and removing the water from the films. The tensile strengths of the various sheets were measured and in each case tensile strength was found to be in the range of 16,000 kNm⁻² to 20,000 kNm⁻².

For purposes of comparison, sheets were prepared in the same way from the 5% suspension used as feed to the spray-drier i.e. without drying the suspension. Tensile strengths of these sheets were generally lower than those from spray-dried powder, with a maximum of about 16,000 kNm⁻² being recorded.

EXAMPLE 14

Vermiculite ore was refluxed with salt solution, washed, then refluxed with n-butylammonium chloride solution as described in Example 1. The resulting suspension (13.5% solids) of swollen but unmilled vermiculite was fed directly to the atomiser of a spray-drier as described in Example 13 and dried into a powder. The feed rate was 800 cm³hr⁻¹ at an inlet temperature of 180° C. and outlet temperature of 100° C.

The product was a free-flowing dry powder. Examination of the powder under an optical stereomicroscope showed that the particles had a platelet configuration.

EXAMPLE 15

Vermiculite sheets made by casting or forming an aqueous paste or slurry of the vermiculite compositions described herein, with or without gasification, may be used as fire-resistant facings or layers in, for example, the manufacture of plastics foam laminates and especially isocyanate-based foam laminates such as polyurethane and polyisocyanurate foam laminates.

Thus, for example, the vermiculite sheet may be formed continuously by extruding an aqueous paste or slurry of the vermiculite composition onto a carrier belt, which may be porous mesh, drying the sheet with hot air and either depositing an isocyanate-based foam mix on the sheet and processing it through a commercially available laminator such as that described in an article entitled "A New Development Machine for the Continuous Lamination of Rigid Urethane Foam" published in "Rubber and Plastics Age" 1966, Vol. 47, No. 1, page 57, or feeding the sheet as the bottom facing in a lamination process such as that described in U.K. Pat. No. 1,053,192 or as a centre core in a lamination process as that described in U.K. Pat. No. 1,136,046. In all cases the isocyanate-based foam may contain glass fibre or other reinforcement to improve the stiffness and fire performance of the laminate.

What we claim is:

1. A free-flowing essentially dry powder composition comprising at least 10% by weight vermiculite lamellae said vermiculite lamellae being obtained from vermiculite which has been swollen by the action of aqueous solutions of salts and delaminated by mechanical shearing of the swollen granules to yield platelets having a thickness of less than one tenth of a micrometer.

2. A free-flowing powder composition as claimed in claim 1 being the product of spray-drying an aqueous suspension comprising vermiculite lamellae.

3. A powder composition as claimed in claim 1 or claim 2 containing from 10% to 95% by weight of vermiculite and from 90% to 5% of one or more additives intended to enhance one or more properties of solid products made from the composition.

4. A powder composition as claimed in claim 1, 2 or 3 incorporating an additive being a compressive strength improver.

5. A powder composition as claimed in any one of claims 1 to 4 incorporating an additive being a water stability improver.

6. A powder composition as claimed in claim 3, 4 or 5 wherein the additive is a particulate material having a basic reaction in water.

7. A powder composition as claimed in claim 6 wherein the particulate material is a metal oxide or hydroxide.

8. A powder composition as claimed in claim 7 wherein the metal is magnesium.

9. A powder composition as claimed in claim 7 wherein the metal is calcium.

10. A powder composition as claimed in claim 3 which comprises at least 20% by weight of vermiculite lamellae.

11. A powder composition as claimed in claim 6 wherein the additive is a particulate material having a solubility in water of not greater than 10 g/l.

12. A powder composition as claimed in claim 11 wherein the solubility in water of the particulate material is less than 3 g/l.

13. A powder composition as claimed in claim 8 wherein the particulate material is magnesium oxide of which the particle size is within the range of from 1 micron to 20 microns.

14. A powder composition as claimed in any one of the preceding claims wherein the vermiculite particles are of size less than 50 microns.

15. A dry powder composition as claimed in claim 1 comprising additionally an inorganic oxide or oxy-acid salt.

16. A dry powder composition as claimed in claim 1 comprising additionally a common filler material.

17. A dry powder composition as claimed in claim 1 comprising additionally a naturally occurring particulate earth material.

18. A dry powder composition as claimed in claim 1 comprising additionally a powdered organic material.

19. A dry powder composition as claimed in claim 1 comprising additionally particles which are hollow microspheres.

* * * * *